(12) United States Patent
Bell et al.

(10) Patent No.: US 7,597,000 B2
(45) Date of Patent: Oct. 6, 2009

(54) TOP VIEW LIQUID SIGHT LEVEL INDICATOR

(75) Inventors: Melissa A. Bell, Spring Valley, CA (US); Christine Ingrid Schade, San Diego, CA (US); Chris R. Fidler, Lakeside, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 380 days.

(21) Appl. No.: 11/494,048

(22) Filed: Jul. 27, 2006

(65) Prior Publication Data

US 2008/0022768 A1   Jan. 31, 2008

(51) Int. Cl.
*G01F 23/30* (2006.01)
(52) U.S. Cl. .............................. 73/323; 73/326; 73/330; 73/331
(58) Field of Classification Search .................. 73/323, 73/326, 330, 331
See application file for complete search history.

(56) References Cited

U.S. PATENT DOCUMENTS

| | | | | |
|---|---|---|---|---|
| 1,867,204 | A | * | 7/1932 | Bohnhardt ................. 73/290 R |
| 2,329,412 | A | * | 9/1943 | Hollis ........................ 73/290 R |
| 2,835,412 | A | * | 5/1958 | Clurman ..................... 222/158 |
| 3,211,321 | A | * | 10/1965 | Holmes ....................... 116/227 |
| 3,370,469 | A | * | 2/1968 | Mackenzie .................... 73/331 |
| 3,371,648 | A | * | 3/1968 | Farina, Jr. .................... 116/276 |
| 3,417,730 | A | * | 12/1968 | Colley et. al. ............... 116/227 |
| 3,589,191 | A | * | 6/1971 | Kelch, Jr. ...................... 73/327 |
| 5,459,609 | A | * | 10/1995 | Schrag ......................... 359/513 |
| 5,634,278 | A | * | 6/1997 | London ......................... 42/132 |

\* cited by examiner

*Primary Examiner*—Hezron Williams
*Assistant Examiner*—Rodney T Frank
(74) *Attorney, Agent, or Firm*—Stephen G. Mican

(57) ABSTRACT

A top reading liquid sight level indicator mounts above a liquid contained in a liquid vessel comprises a measuring surface mounted to the liquid vessel that penetrates an upper surface of the contained liquid at a cant from normal to the liquid surface so that the points along the measuring surface that penetrate the liquid surface are visible from above the liquid vessel and represent the level of the liquid in the liquid vessel.

13 Claims, 7 Drawing Sheets

TOP VIEW LIQUID SIGHT LEVEL INDICATOR

FIELD OF THE INVENTION

The invention relates to a sight level indicator for a liquid in a vessel, and more particularly to a sight level indicator that indicates liquid level in a vessel from a perspective that is generally perpendicular to the surface of the liquid in the vessel.

BACKGROUND OF THE INVENTION

Sight level indicators are suitable for visual inspection of liquid levels in vessels for many applications. For instance, such a sight level indicator may indicate oil level in an oil reservoir, fuel level in a fuel tank or water level in a boiler. Such sight level indicators that are in current use rely on a visible scale that is generally perpendicular to the surface of the liquid and has scale gradations on it that indicate the liquid level.

Such sight level indicators lend themselves well to mounting on a side of the liquid vessel. The scale gradations representing level are then clearly visible. However, in applications where side mounting of sight level indicators are not possible, top mounted sight level indicators are necessary. In these instances, such top mounted indicators generally have optical systems that make the perpendicular scale gradations visible from above the surface of the liquid. For instance, a prism or a mirror system may be suitable for this purpose.

However, such optical systems add to cost and they are subject to contamination by the liquid. A top reading liquid sight glass that can read the liquid level without such optical systems would be a great improvement.

SUMMARY OF THE INVENTION

The invention comprises a top reading liquid sight level indicator that mounts above a liquid contained in a liquid vessel and has a measuring surface that penetrates the surface of the liquid, wherein the measuring surface cants from normal to the surface of the liquid so that the points on the measuring surface that penetrate the surface of the liquid indicate the level of the liquid.

More particularly, the invention comprises a top reading liquid sight level indicator that mounts above a liquid contained in a liquid vessel comprising: a measuring surface mounted to the liquid vessel that penetrates an upper surface of the contained liquid at a cant from normal to the liquid surface; wherein the points along the measuring surface that penetrate the liquid surface are visible from above the liquid vessel and represent the level of the liquid in the liquid vessel.

DETAILED DESCRIPTION OF THE INVENTION

Figure 2:
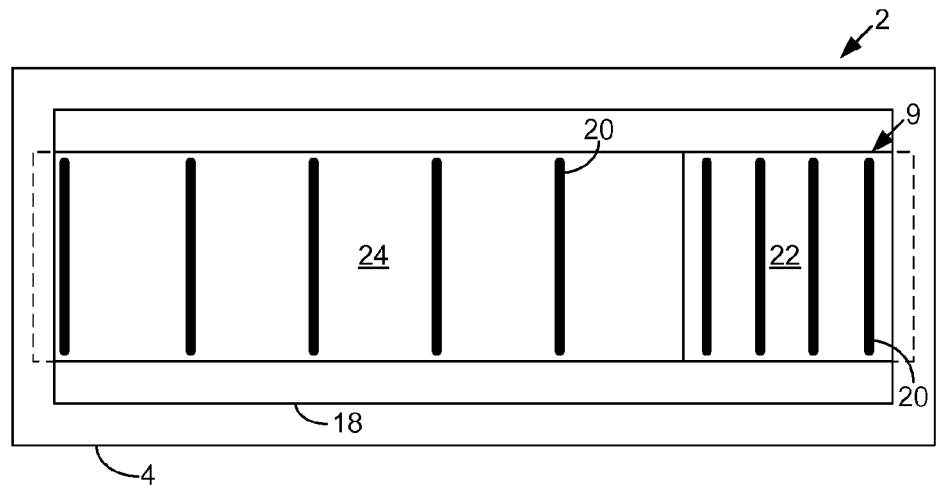
FIGS. 1 and 2 are side and top views, respectively, of a top reading liquid sight level indicator according to a first possible embodiment of the invention.
Figure 1:
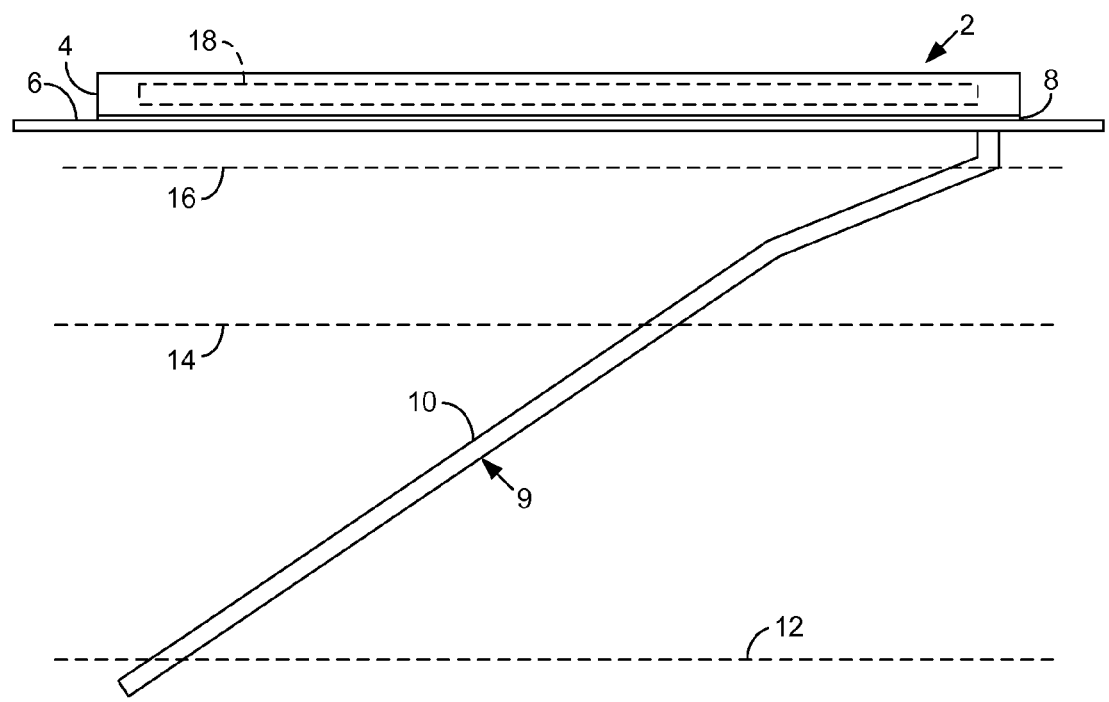

FIGS. 1 and 2 are side and top views, respectively, of a top reading liquid sight level indicator 2 according to a first possible embodiment of the invention. Referring to FIGS. 1 and 2 together, the indicator 2 has a mounting frame 4 that mounts to a vessel surface 6 of a liquid vessel (not shown) situated above the surface of a liquid contained in the liquid vessel. A gasket 8 may provide a liquid-tight seal between the mounting frame 4 and the vessel surface 6. A measuring element 9 with a measuring surface 10 facing the vessel surface 6 and coupled to the mounting frame 4 penetrates the surface of a liquid contained in the liquid vessel, represented by a minimum surface level 12, an intermediate surface level 14 and a maximum surface level 16. A liquid-tight sight glass 18 mounts within the mounting frame 4 to provide a clear view of the measuring surface 10 from above the vessel surface 6.

The measuring element 9 cants from normal to the surfaces 12, 14 and 16 such that the measuring surface 10 penetrates the surfaces 12, 14 and 16 at different lateral points along the measuring surface10. Scale gradations 20 may indicate the liquid level in the liquid vessel at different points along the measuring surface 10. The scale gradations 20 may lay along the sight glass 18 or the measuring surface 10 itself.

The measuring surface 10 may cant at any desired angle or combination of angles from normal to the surfaces 12,14 and 16. The measuring surface 10 may be rectilinear, curvilinear, or any combination of such surfaces. For instance, FIG. 1 shows the measuring surface 10 with two rectilinear surface portions, a first measuring surface portion 22 at a first cant angle and a second measuring surface portion 24 at a second cant angle. The first measuring surface portion 22 has a relatively steep cant angle so that each of its scale gradations 20 represent a unit of liquid level to accurately measure the liquid level near the maximum surface level 16 and reduce the possibility of overfill. The second measuring surface portion 24 has a relatively shallow cant angle so that its scale gradations 20 cover a wider range of liquid levels so that they can measure down to the minimum surface level 12. In this case, each of the scale gradations along the second measuring surface portion 24 represents four units of liquid level.

Figure 3:
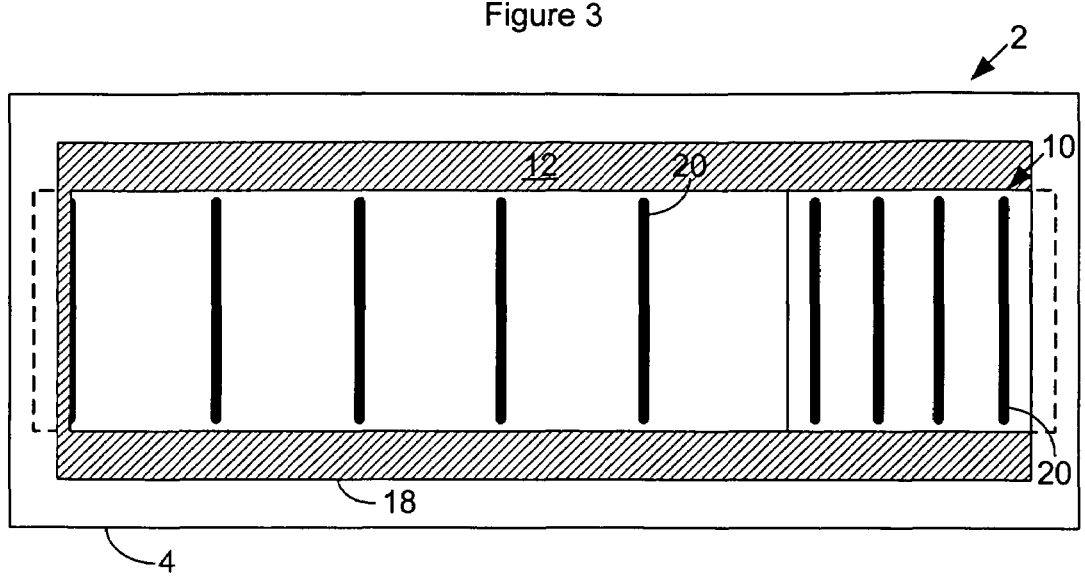
FIGS. 3 through 5 are top views of the top reading liquid sight level indicator shown in FIGS. 1 and 2 that show how it displays liquid levels in a liquid vessel for minimum, intermediate and maximum liquid surface levels.
Figure 4:
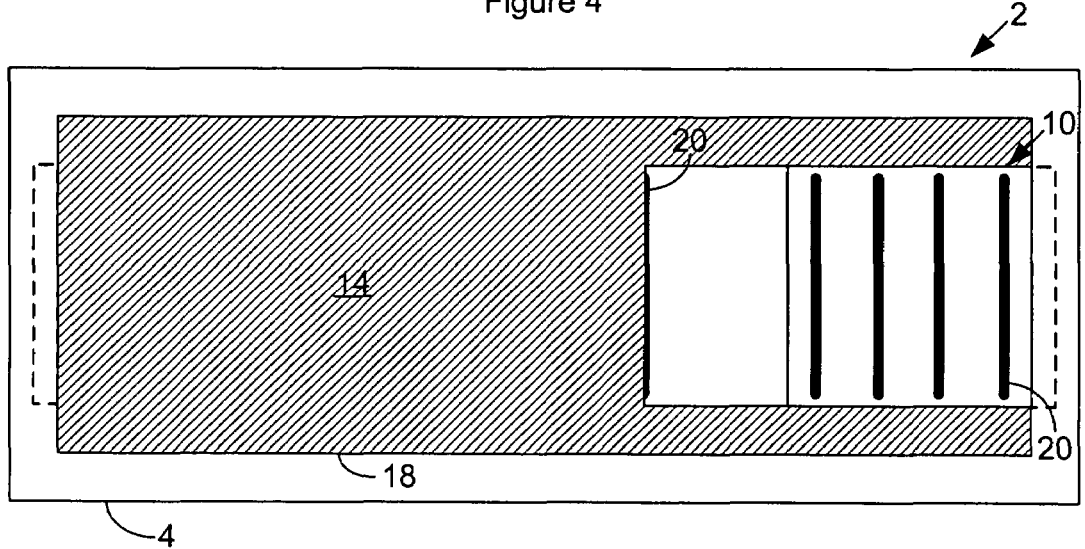
Figure 5:
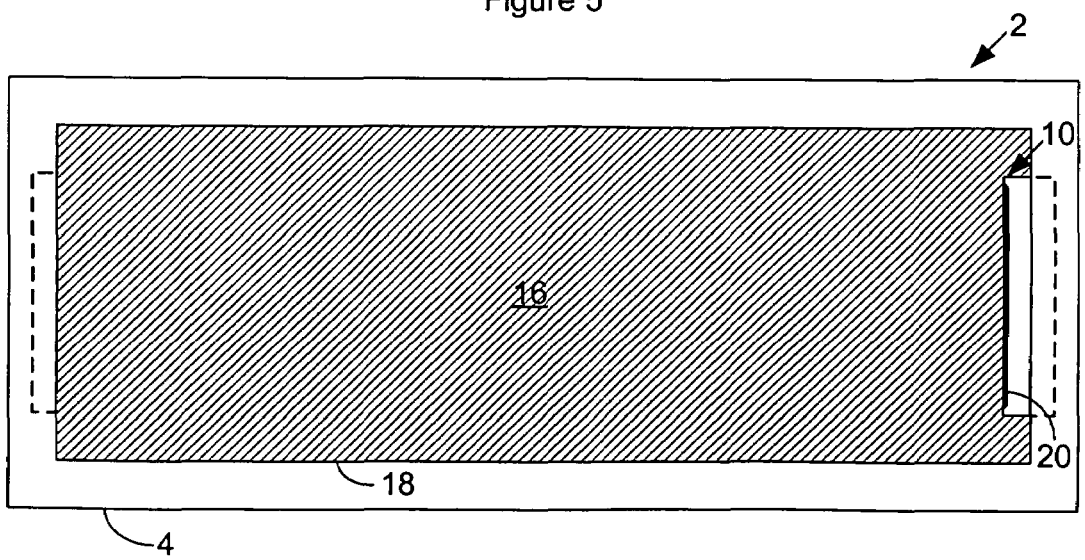

FIGS. 3 through 5 are top views of the top reading liquid sight level indicator 2 shown in FIGS. 1 and 2 that show how it displays liquid levels in a liquid vessel for the minimum, intermediate and maximum liquid surface levels 12, 14 and 16. As shown in FIG. 3, when the liquid in the liquid vessel is at the minimum surface level 12, the minimum surface level 12 just touches the leftmost scale gradation 20 on the measuring surface 10 that represents the minimum surface level 12. As shown in FIG. 4, when the liquid in the liquid vessel is at the intermediate surface level 14, the intermediate surface level 14 just touches the scale gradation 20 that is fifth from the left on the measuring surface 10 that represents the intermediate surface level 14. Finally, as shown in FIG. 5, when the liquid in the liquid vessel is at the maximum surface level 16, the maximum surface level 16 just touches the rightmost scale gradation 20 on the measuring surface 10 that represents the maximum surface level 16. Of course, the other scale gradations 20 on the measuring surface 10 may represent other surface levels of the liquid in the liquid vessel that are in between the minimum, intermediate and maximum liquid surface levels 12, 14 and 16.

Figure 7:
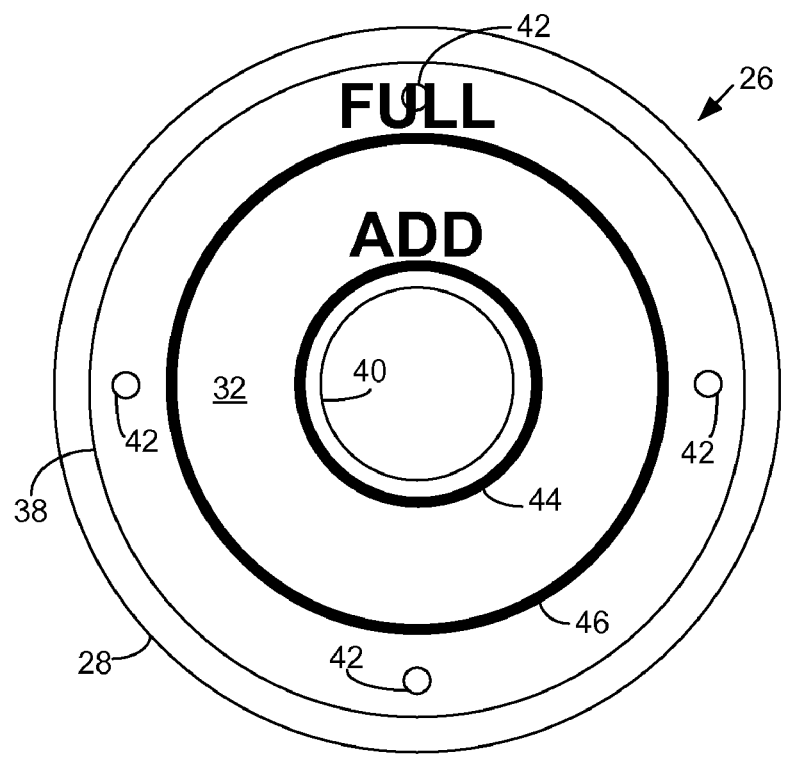
FIGS. 6 and 7 are side and top views, respectively, of a top reading liquid sight level indicator according to a second possible embodiment of the invention.
Figure 6:
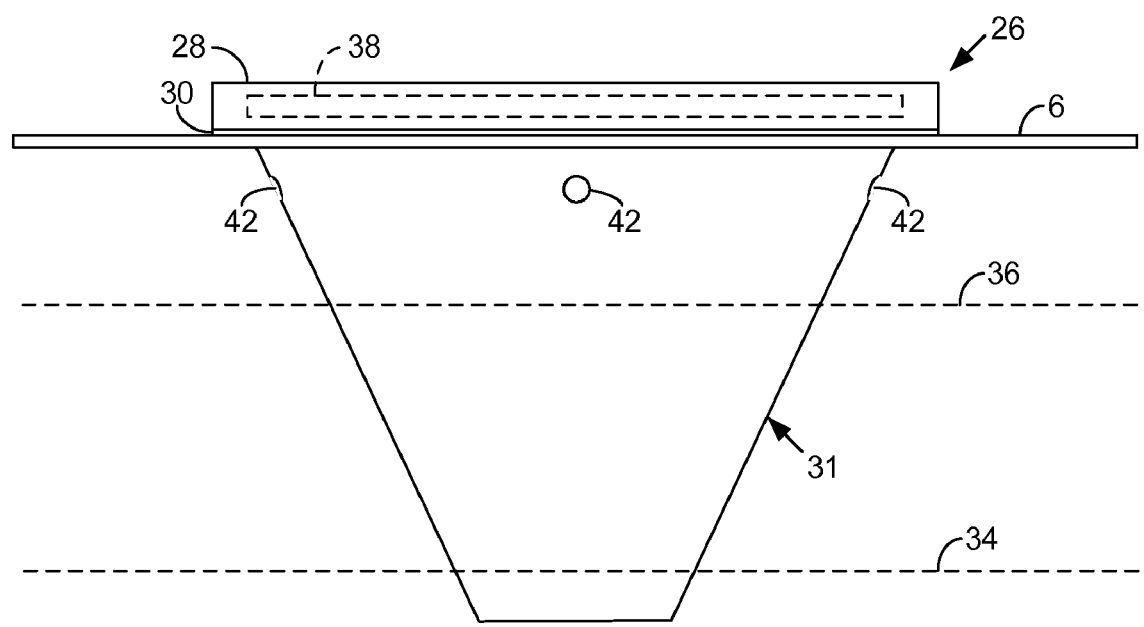

FIGS. 6 and 7 are side and top views, respectively, of a top reading liquid sight level indicator 26 according to a second possible embodiment of the invention. Referring to FIGS. 6 and 7 together, the indicator 26 has a mounting frame 28 that mounts to the vessel surface 6. A gasket 30 may provide a liquid-tight seal between the mounting frame 28 and the vessel surface 6. A measuring element 31 with a measuring surface 32 facing the vessel surface 6 that has the general form of a truncated cone penetrates the surface of a liquid contained in the liquid vessel, represented by a minimum surface level 34 and a maximum surface level 36. A liquid-tight sight glass 38 mounts within the mounting frame 28 to provide a clear view of the measuring surface 32 from above the vessel surface 6.

The measuring surface 32 cants from normal to the liquid surfaces 34 and 36 such that the measuring surface 32 penetrates the surfaces 34 and 36 at different lateral points along the measuring surface 32. At least one flow aperture 40 in the bottom of the measuring element 31 allows the liquid to flow to the interior of the measuring element 31 to reach the measuring surface 32. At least one pressure relief aperture 42 allows air to escape the interior of the measuring element 31 as liquid flows into it.

The measuring surface 32 may cant at any desired angle or combination of angles from normal to the surfaces 34 and 36. The measuring surface 32 may also be in the general form of any truncated surface of revolution, such as a truncated pyramid or truncated ellipsoid. Scale gradations that represent level along the measuring surface 32, such as minimum surface level gradation 44 and maximum surface level gradation 46, facilitate measurement of the liquid level in the liquid vessel. The surface level scale gradations 44 and 46 may lay along the sight glass 38 or the measuring surface 32.

Figure 8:
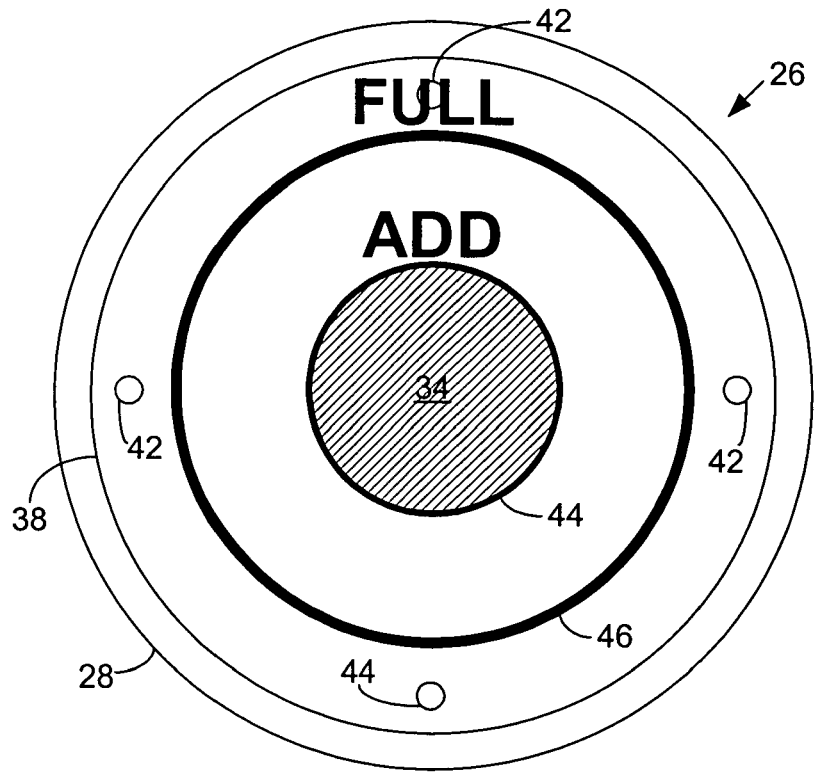
FIGS. 8 and 9 are top views of the top reading liquid sight level indicator shown in FIGS. 6 and 7 that shown how it displays liquid levels in a liquid vessel for minimum and maximum liquid surface levels.
Figure 9:
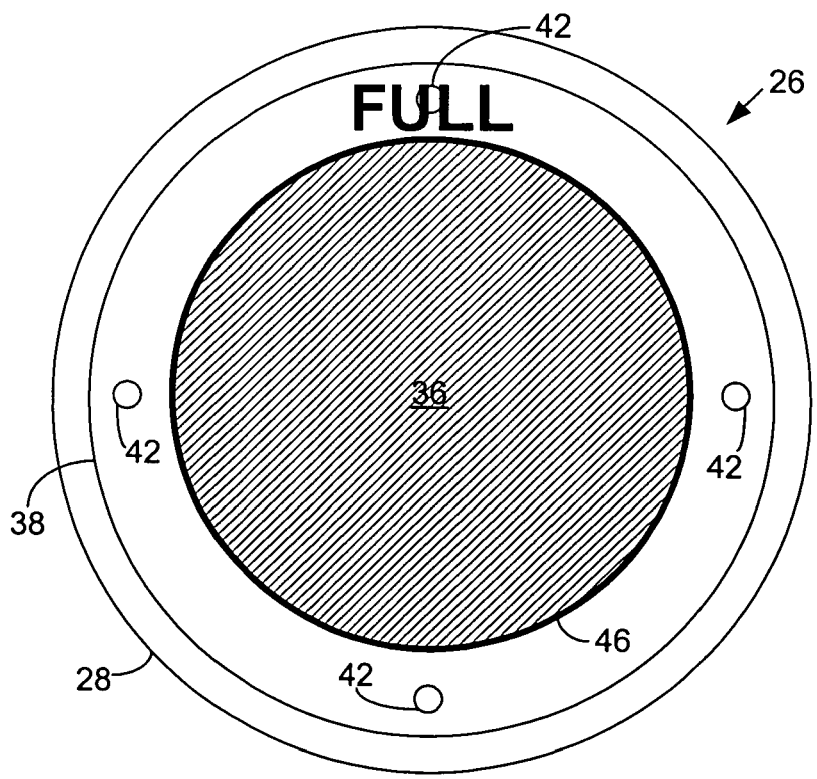

FIGS. 8 and 9 are top views of the top reading liquid sight level indicator 26 shown in FIGS. 6 and 7 that shows how it displays liquid levels in a liquid vessel for minimum and maximum liquid surface levels 34 and 36. As shown in FIG. 8, when the liquid in the liquid vessel is at the minimum surface level 34, the minimum surface level 34 just touches the surface level scale gradation 44 on the measuring surface 32 that represents the minimum surface level 34. As shown in FIG. 9, when the liquid in the liquid vessel is at the maximum surface level 36, the maximum surface level 36 just touches the surface level scale gradation 46 on the measuring surface 32 that represents the maximum surface level 36.

Figure 10:
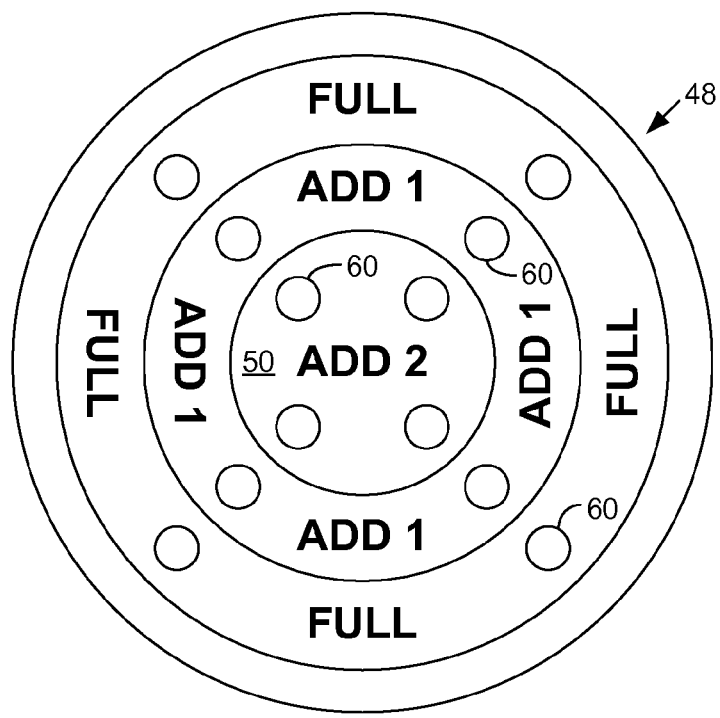
FIGS. 10 and 11 are side and top views, respectively, of a top reading liquid sight level indicator according to a third possible embodiment of the invention.
Figure 11:
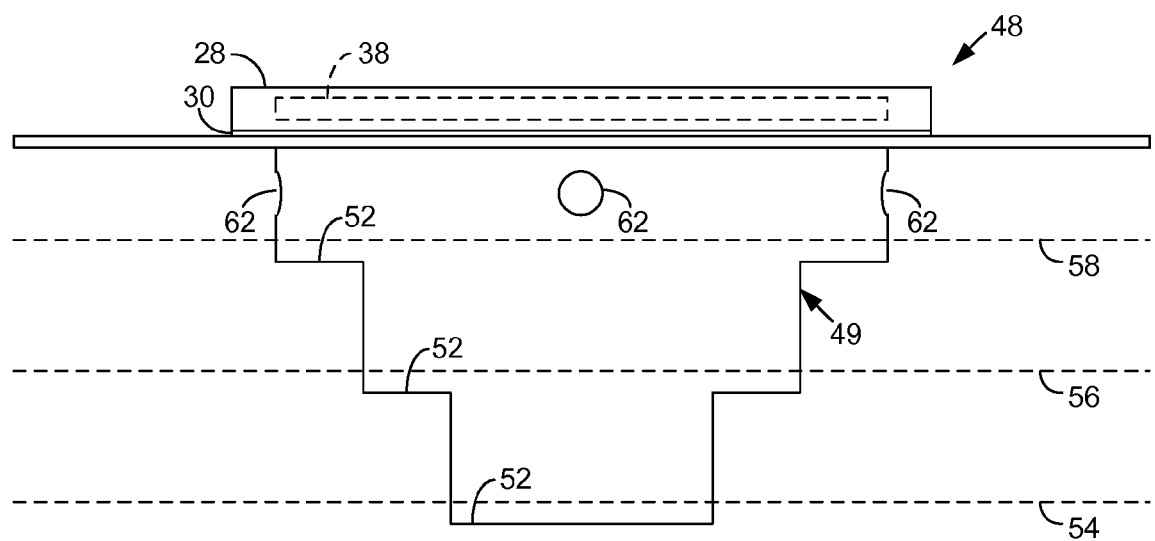

The described embodiments may also employ a measuring surface that approximates a cant from normal to the surface level of the liquid in a liquid vessel, such as with a series of steps with a staircase-like surface. FIGS. 10 and 11 are side and top views, respectively, of a top reading liquid sight level indicator 48 according to a third possible embodiment of the invention that comprises a measuring surface with such an approximation. The top reading liquid sight level indicator may have the same mounting frame 28, sealing gasket 30 and sight glass 38 hereinbefore described for the second possible embodiment of the invention in connection with FIGS. 6 and 7. However, a measuring element 49 that has a staircase-like measuring surface 50 with a plurality of steps 52 facing the vessel surface 6 that approximates a cant from normal to minimum surface level 54, intermediate surface level 56 and maximum surface level 58 of a liquid in the liquid vessel replaces the measuring surface 32 as used in the second embodiment.

At least one flow aperture 60 in the bottom of the measuring element 49 allows the liquid to flow to the interior of the measuring element 49. Preferably, a plurality of apertures 60 on each of the steps 52 through the measuring element 49 provides such flow. At least one pressure relief aperture 62 allows air to escape the interior of the measuring element 49 as liquid flows into it. It is convenient for each step 52 to represent a different surface level of the liquid in the liquid vessel, such as the minimum, intermediate and maximum surface levels 54, 56 and 58. In this case, markings on each step 52 may represent scale gradations for each of these surface levels.

Figure 12:
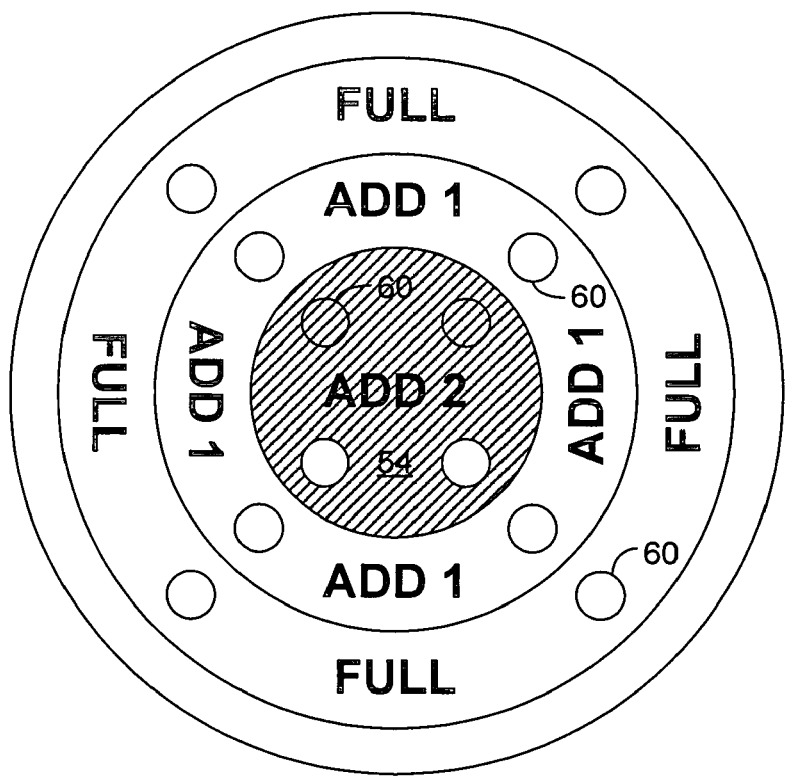
FIGS. 12 through 14 are top views of the top reading liquid sight level indicator shown in FIGS. 10 and 11 that shows how it displays liquid levels in a liquid vessel for minimum, intermediate and maximum liquid surface levels.
Figure 13:
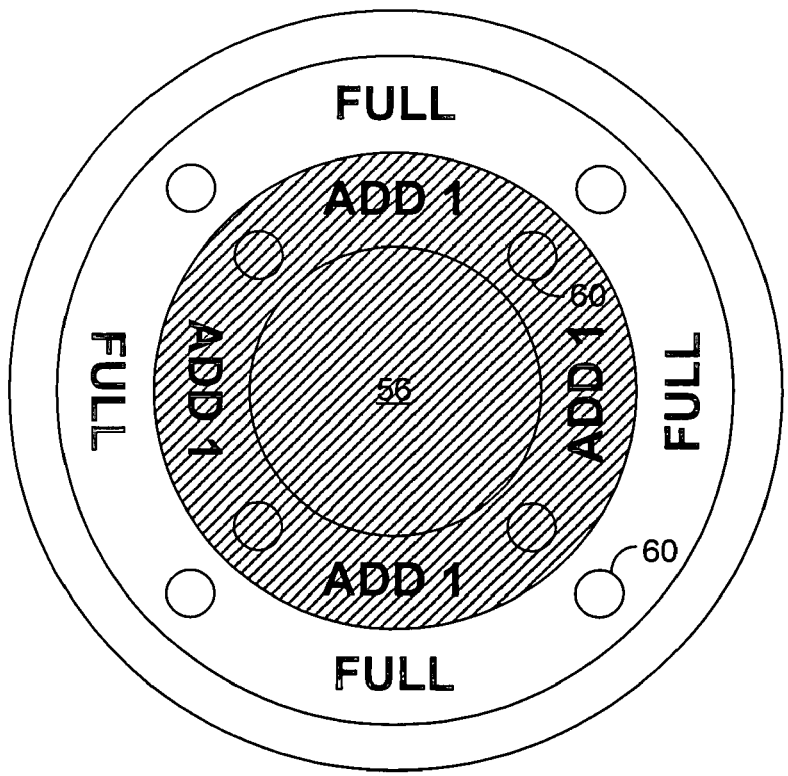
Figure 14:
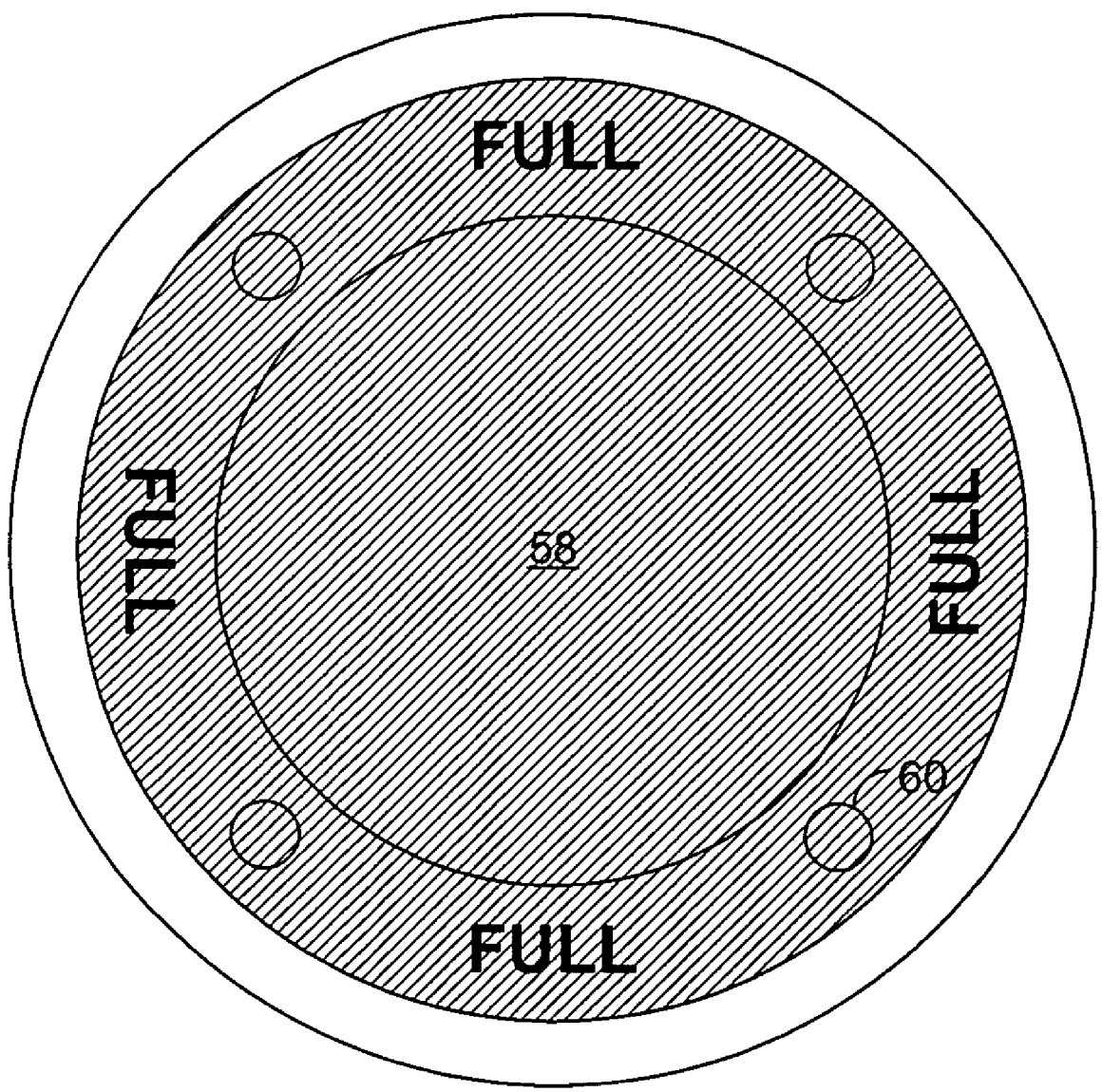

FIGS. 12 through 14 are top views of the top reading liquid sight level indicator 48 that shows how it displays liquid levels in a liquid vessel for minimum, intermediate and maximum liquid surface levels 54, 56 and 58. As shown in FIG. 12, when the liquid in the liquid vessel is at the minimum surface level 54, the minimum surface level 54 just covers the innermost step 52. As shown in FIG. 13, when the liquid in the liquid vessel is at the intermediate surface level 56, the intermediate surface level 56 just covers the intermediate step 52. As shown in FIG. 14, when the liquid in the liquid vessel is at the maximum surface level 58, the maximum surface level 58 just covers the outermost step 52.

The described embodiments of the invention are only some illustrative implementations of the invention wherein changes and substitutions of the various parts and arrangement thereof are within the scope of the invention as set forth in the attached claims.

The claimed invention is:

1. A top reading liquid sight level indicator that mounts above a liquid contained in a liquid vessel, comprising:
   a measuring element mounted to a surface of the liquid vessel above the contained liquid with a measuring surface facing the vessel surface that penetrates an upper surface of the contained liquid at a cant from normal to the liquid surface;
   wherein the points along the measuring surface that penetrate the liquid surface are visible from above the liquid vessel and represent the level of the liquid in the liquid vessel.

2. The indicator of claim 1, further comprising a mounting frame that couples to a surface of the liquid vessel above the contained liquid.

3. The indicator of claim 2, further comprising a liquid-tight sight glass that mounts within the mounting frame to provide a view of the measuring surface from above the liquid vessel.

4. The indicator of claim 2, wherein the measuring surface comprises at least one rectilinear surface that penetrates the surface of the liquid at a cant from normal to the liquid surface.

5. The indicator of claim 4, wherein the measuring surface comprises a plurality of different measuring surface portions that each have a different cant from normal to the liquid surface.

6. The indicator of claim 2, wherein the measuring surface comprises a truncated surface of revolution.

7. The indicator of claim 6, wherein the measuring surface comprises a truncated cone.

8. The indicator of claim 2, wherein the measuring surface comprises a staircase-like surface with a plurality of steps that approximates a surface that cants from normal to the liquid surface.

9. The indicator of claim 8, wherein each step represents a different surface level of the liquid in the liquid vessel.

10. The indicator of claim 2, further comprising scale gradations along the measuring surface that indicate the surface level of the liquid in the liquid vessel.

11. The indicator of claim 2, further comprising scale gradations along the sight glass that indicate the surface level of the liquid in the liquid vessel.

12. A top reading liquid sight level indicator that mounts above a liquid contained in a liquid vessel, comprising:
- a mounting frame that couples to a surface of the liquid vessel above the contained liquid;
- a measuring element coupled to the mounting frame with a measuring surface facing the vessel surface comprising at least one measuring surface portion comprising a staircase-like surface with a plurality of steps that penetrates an upper surface of the contained liquid and approximates a surface that cants from normal to the liquid surface; and
- a liquid-tight sight glass that mounts within the mounting frame to provide a view of the measuring surface from above the liquid vessel;
- wherein the points along the measuring surface that penetrate the liquid surface are visible from above the sight glass and represent the level of the liquid in the liquid vessel.

13. The indicator of claim 12, wherein each step represents a different surface level of the liquid in the liquid vessel.

* * * * *

UNITED STATES PATENT AND TRADEMARK OFFICE
CERTIFICATE OF CORRECTION

PATENT NO. : 7,597,000 B2  Page 1 of 1
APPLICATION NO. : 11/494048
DATED : October 6, 2009
INVENTOR(S) : Bell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 451 days.

Signed and Sealed this

Twenty-eighth Day of September, 2010

David J. Kappos
*Director of the United States Patent and Trademark Office*